US012693797B2

(12) United States Patent
Allen et al.

(10) Patent No.: US 12,693,797 B2
(45) Date of Patent: *Jul. 28, 2026

(54) SECURE ONE-TIME PROGRAMMING UNDO SYSTEM

(71) Applicant: Dell Products L.P., Round Rock, TX (US)

(72) Inventors: Gregory Martin Allen, Layton, UT (US); Jonathan Jay Kellen, Dassel, MN (US); Austin Patrick Bolen, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 46 days.

This patent is subject to a terminal disclaimer.

(21) Appl. No.: 18/921,247

(22) Filed: Oct. 21, 2024

(65) Prior Publication Data

US 2025/0044958 A1     Feb. 6, 2025

Related U.S. Application Data

(63) Continuation of application No. 17/942,855, filed on Sep. 12, 2022, now Pat. No. 12,153,806.

(51) Int. Cl.
G06F 9/46          (2006.01)
G06F 3/06          (2006.01)

(52) U.S. Cl.
CPC .......... *G06F 3/0622* (2013.01); *G06F 3/0634* (2013.01); *G06F 3/0673* (2013.01)

(58) Field of Classification Search
None
See application file for complete search history.

(56) References Cited

U.S. PATENT DOCUMENTS

| | | | | |
|---|---|---|---|---|
| 9,984,021 | B1 * | 5/2018 | BeSerra | ............. G06F 13/4221 |
| 10,698,696 | B2 * | 6/2020 | Raghuram | ............. G06F 9/441 |
| 11,500,994 | B2 * | 11/2022 | Khatri | ....................... G06F 8/63 |
| 11,582,033 | B2 * | 2/2023 | Kumar | ..................... G09C 1/00 |

* cited by examiner

*Primary Examiner* — Christopher B Robinson
(74) *Attorney, Agent, or Firm* — Joseph Mencher

(57)          ABSTRACT

A secure one-time programming undo system includes a component and a component configuration system. A one-time programming subsystem in the component configuration system provides the component with personality configuration information that configures the component to perform component operations, and performs a one-time programming operation that configures a component engine in the component to deny modification requests to modify the personality configuration information. A one-time programming undo subsystem in the component configuration system performs a one-time programming undo authentication operation, and transmits a one-time programming undo instruction that is associated with the one-time programming undo authentication operation to the component, with the one-time programming undo authentication operation configured to authenticate the one-time programming undo instruction to the component such that the component executes the one-time programming undo instruction that reconfigures the component engine in the component to allow modification requests to modify the personality configuration information.

20 Claims, 21 Drawing Sheets

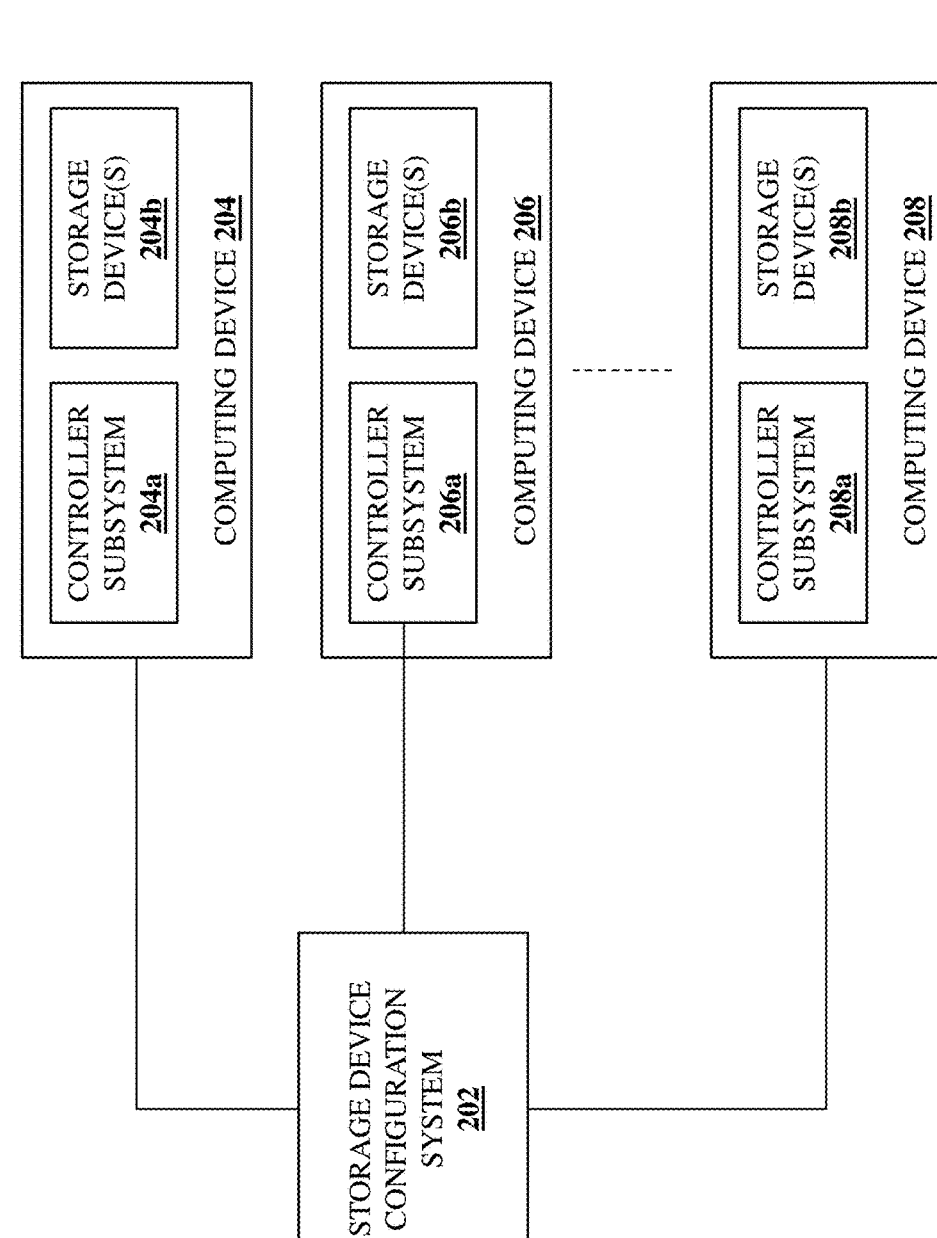
FIG. 2

302

COMMUNICATION
SYSTEM
308

STORAGE DEVICE
ENGINE
304

SECURE
MEMORY SYSTEM 306

STORAGE DEVICE 300

ONE-TIME PROGRAMMING ENGINE 404a

ONE-TIME PROGRAMMING UNDO ENGINE 404b

COMMUNICATION SYSTEM 408

ONE-TIME PROGRAMMING DATABASE 406a

ONE-TIME PROGRAMMING UNDO DATABASE 406b

STORAGE DEVICE CONFIGURATION SYSTEM 400

402

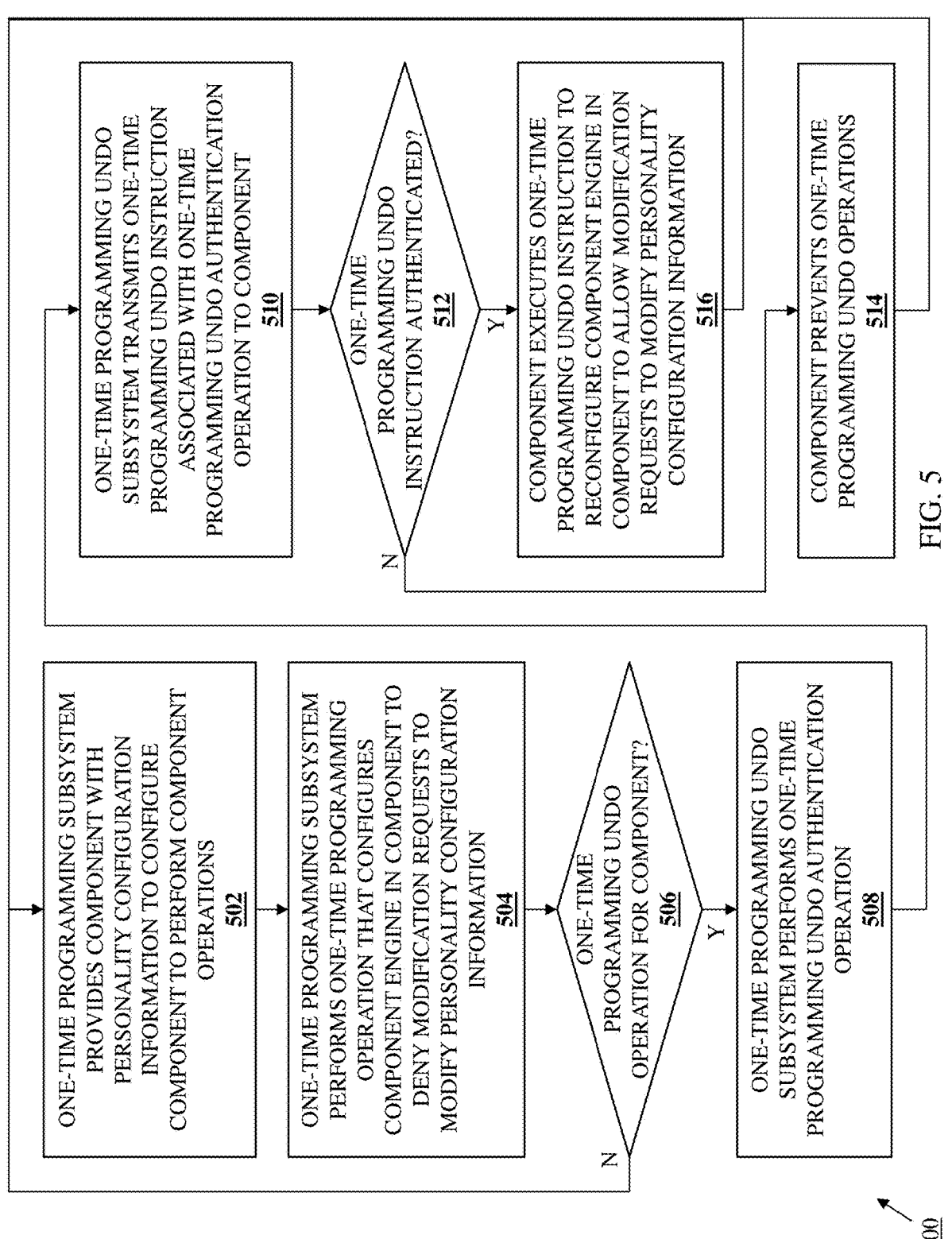

ONE-TIME PROGRAMMING SUBSYSTEM PROVIDES COMPONENT WITH PERSONALITY CONFIGURATION INFORMATION TO CONFIGURE COMPONENT TO PERFORM COMPONENT OPERATIONS
502

ONE-TIME PROGRAMMING SUBSYSTEM PERFORMS ONE-TIME PROGRAMMING OPERATION THAT CONFIGURES COMPONENT ENGINE IN COMPONENT TO DENY MODIFICATION REQUESTS TO MODIFY PERSONALITY CONFIGURATION INFORMATION
504

ONE-TIME PROGRAMMING UNDO OPERATION FOR COMPONENT?
506

N

Y

ONE-TIME PROGRAMMING UNDO SUBSYSTEM PERFORMS ONE-TIME PROGRAMMING UNDO AUTHENTICATION OPERATION
508

ONE-TIME PROGRAMMING UNDO SUBSYSTEM TRANSMITS ONE-TIME PROGRAMMING UNDO INSTRUCTION ASSOCIATED WITH ONE-TIME PROGRAMMING UNDO AUTHENTICATION OPERATION TO COMPONENT
510

ONE-TIME PROGRAMMING UNDO INSTRUCTION AUTHENTICATED?
512

N

Y

COMPONENT EXECUTES ONE-TIME PROGRAMMING UNDO INSTRUCTION TO RECONFIGURE COMPONENT ENGINE IN COMPONENT TO ALLOW MODIFICATION REQUESTS TO MODIFY PERSONALITY CONFIGURATION INFORMATION
516

COMPONENT PREVENTS ONE-TIME PROGRAMMING UNDO OPERATIONS
514

ONE-TIME
PROGRAMMING
ENGINE
404a

ONE-TIME
PROGRAMMING UNDO
ENGINE
404b

ONE-TIME
PROGRAMMING
DATABASE
406a

ONE-TIME
PROGRAMMING
UNDO DATABASE
406b

COMMUNICATION
SYSTEM
408

STORAGE DEVICE CONFIGURATION SYSTEM 400

FIG. 6B

302

COMMUNICATION SYSTEM 308

602

STORAGE DEVICE ENGINE 304

602

PERSONALITY CONFIGURATION INFORMATION 604

SECURE MEMORY SYSTEM 306

STORAGE DEVICE 300

402

608

606

ONE-TIME PROGRAMMING ENGINE 404a

ONE-TIME PROGRAMMING UNDO ENGINE 404b

COMMUNICATION SYSTEM 408

ONE-TIME PROGRAMMING DATABASE 406a

ONE-TIME PROGRAMMING UNDO DATABASE 406b

STORAGE DEVICE CONFIGURATION SYSTEM 400

FIG. 6E

FIG. 7
200
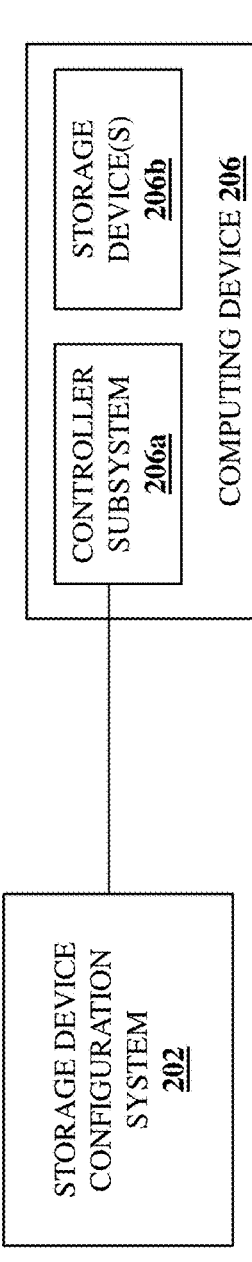

Figure 8A:
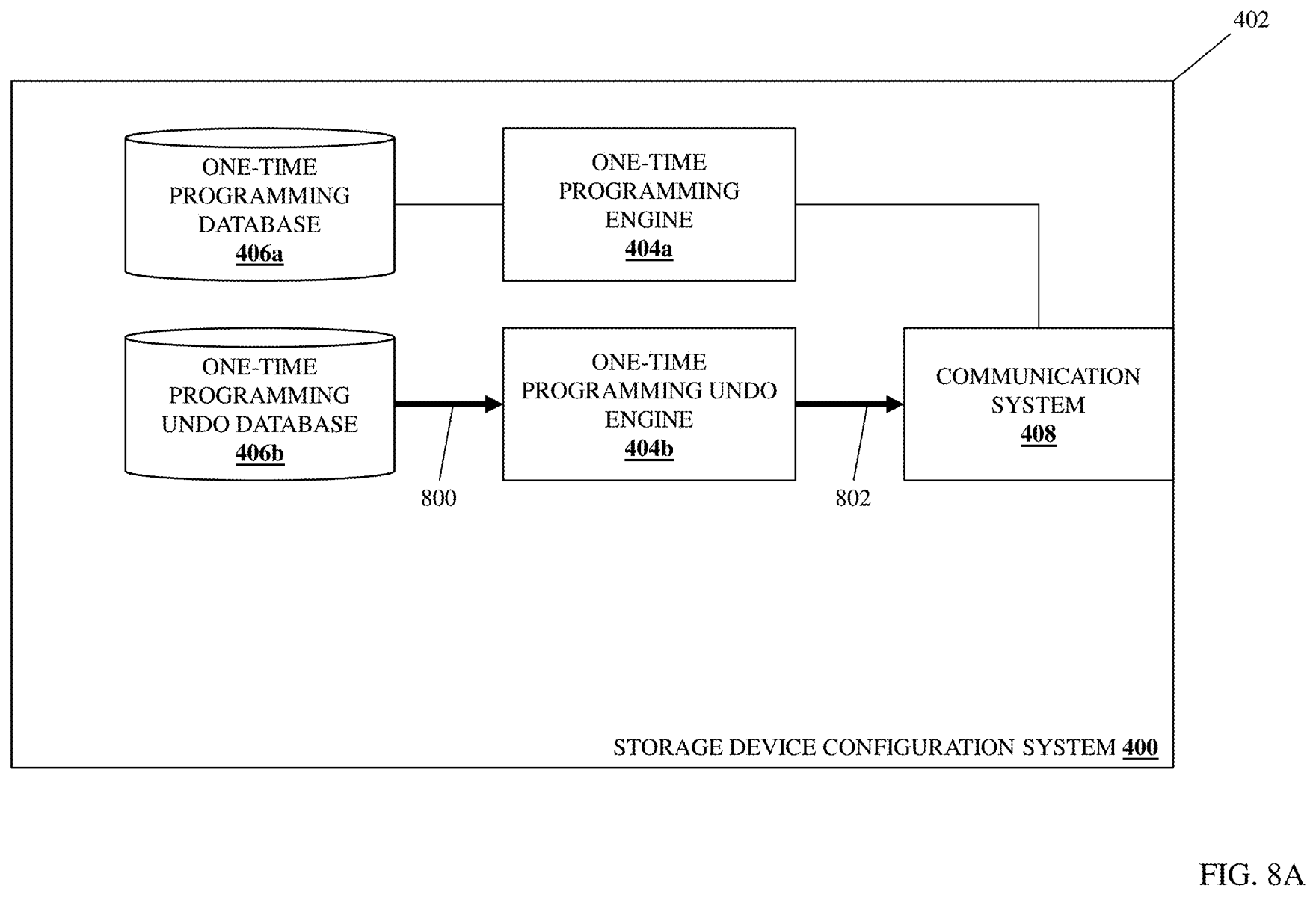

402

ONE-TIME
PROGRAMMING
ENGINE
404a

ONE-TIME
PROGRAMMING UNDO
ENGINE
404b

ONE-TIME
PROGRAMMING
DATABASE
406a

ONE-TIME
PROGRAMMING
UNDO DATABASE
406b

COMMUNICATION
SYSTEM
408

800

802

STORAGE DEVICE CONFIGURATION SYSTEM 400

COMMUNICATION SYSTEM 308

802

STORAGE DEVICE ENGINE 304

804

PERSONALITY CONFIGURATION INFORMATION 604

PERSONALITY CONFIGURATION LOCK SETTING 610

SECURE MEMORY SYSTEM 306

STORAGE DEVICE 300

402

STORAGE DEVICE CONFIGURATION SYSTEM 400

COMMUNICATION
SYSTEM
408

900

ONE-TIME
PROGRAMMING
ENGINE
404a

ONE-TIME
PROGRAMMING UNDO
ENGINE
404b

ONE-TIME
PROGRAMMING
DATABASE
406a

ONE-TIME
PROGRAMMING
UNDO DATABASE
406b

302

COMMUNICATION SYSTEM
308

902

STORAGE DEVICE ENGINE
304

PERSONALITY CONFIGURATION INFORMATION
604

PERSONALITY CONFIGURATION LOCK SETTING
610

SECURE MEMORY SYSTEM 306

STORAGE DEVICE 300

402

STORAGE DEVICE CONFIGURATION SYSTEM 400

ONE-TIME PROGRAMMING DATABASE 406a

ONE-TIME PROGRAMMING UNDO DATABASE 406b

ONE-TIME PROGRAMMING ENGINE 404a

ONE-TIME PROGRAMMING UNDO ENGINE 404b

1000

COMMUNICATION SYSTEM 408

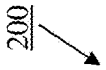
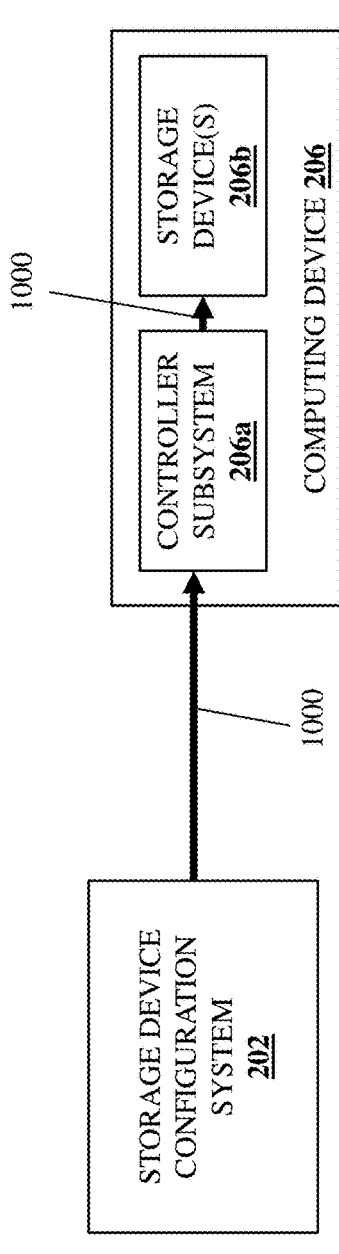

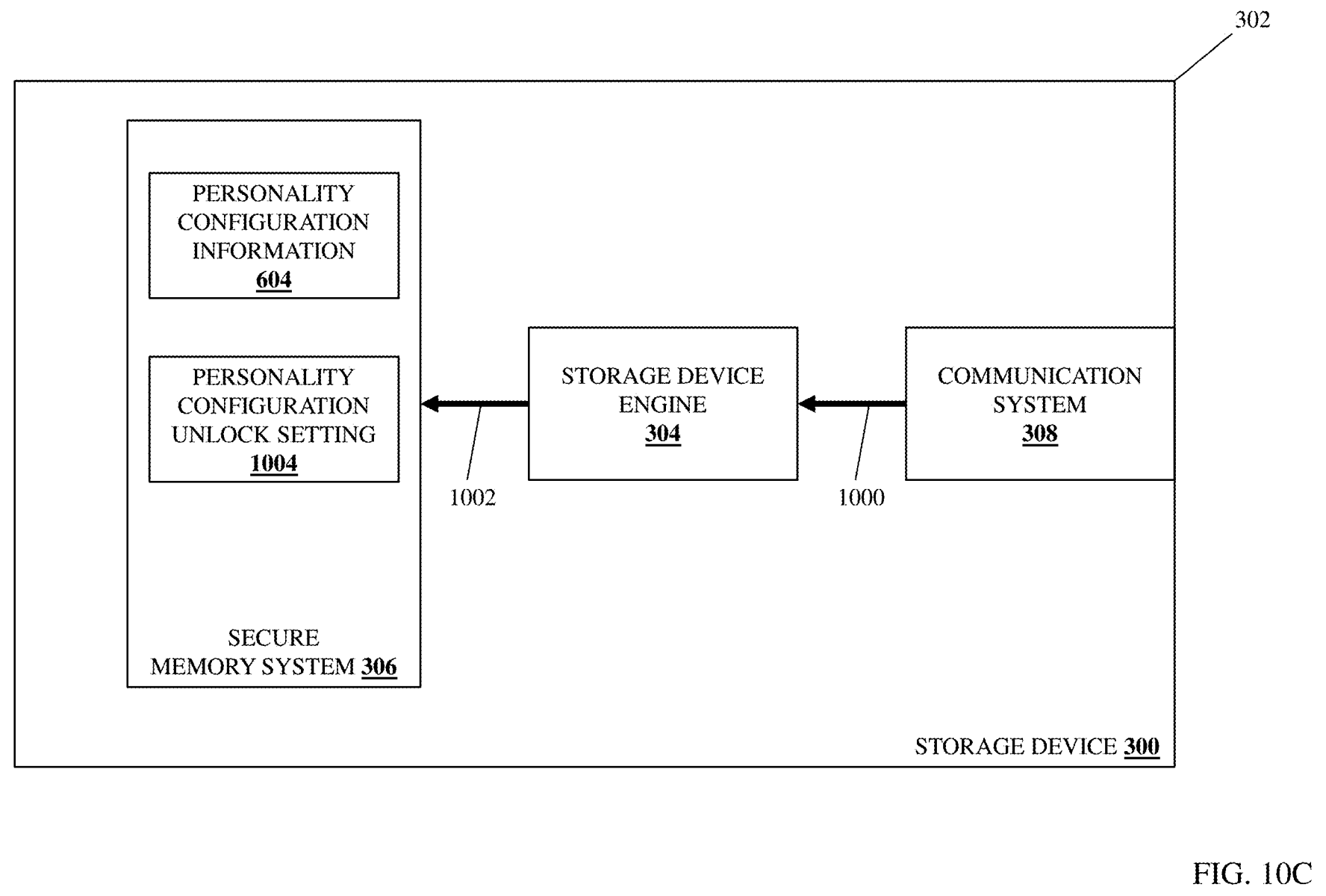

302

STORAGE DEVICE 300

COMMUNICATION SYSTEM 308

1000

STORAGE DEVICE ENGINE 304

1002

SECURE MEMORY SYSTEM 306

PERSONALITY CONFIGURATION INFORMATION 604

PERSONALITY CONFIGURATION UNLOCK SETTING 1004

FIG. 10C

SECURE ONE-TIME PROGRAMMING UNDO
SYSTEM

CROSS-REFERENCE TO RELATED
APPLICATION

The present application is a continuation of U.S. patent application Ser. No. 17/942,855, filed Sep. 12, 2022, the disclosure of which is incorporated by reference herein in its entirety.

BACKGROUND

The present disclosure relates generally to information handling systems, and more particularly to undoing the one-time programming of components used in information handling systems in order to allow for the modification of their personality configurations.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices and/or other computing devices known in the art, sometime include components that may utilize one of a plurality of different component personality configurations. For example, the computing devices discussed above may utilize storage devices for the storage of their data, and those storage devices may be provided with different storage device personality configurations that define the operation of those storage devices. To provide a specific example, the storage devices discussed above may be configurable with either a security-locking-capable personality configuration (e.g., to configure the storage device as a Trusted Computing Group Secure Encrypted Drive (TCG-SED) storage device) that prevents read operations and write operations using the storage device unless authentication credentials are provided, or a security-locking-incapable personality configuration that allows read operations and write operations using the storage device without the need to provide authentication credentials.

Computing device manufacturers may manufacture computing devices that include the storage devices discussed above, and may provide storage devices having a particular personality configurations in computing devices based on a number of factors. Continuing with the specific example provided above, some countries or jurisdictions may not allow storage devices with the security-locking-capable personality configuration discussed above to be imported, sold, and/or otherwise utilized, and conventional computing device manufacturers typically stock/inventory both security-locking-capable storage devices configured with the security-locking-capable personality configurations discussed above, as well as security-locking-incapable storage devices configured with the security-locking-incapable personality configurations discussed above, in order to allow for the manufacture of computing devices for countries/jurisdictions that allow storage devices with the security-locking-capable personality configurations, as well as for countries/jurisdictions that do not allow storage devices with security-locking-capable personality configurations. However, the stocking/inventorying of different storage devices with different personality configurations increases the complexity of the computing device manufacturing process for the computing device manufacturer with regard to increased storage device inventories, storage device manufacturer/supplier logistics, etc.

Some of the inventors of the present disclosure have described techniques for addressing the issues discussed above in U.S. patent application Ser. No. 16/863,668, filed on Apr. 30, 2020, the disclosure of which is incorporated by reference herein in its entirety. That patent document is directed to one-time programmable features for storage devices that allow a particular personality configuration to be provided for a storage device with a one-time-programming operation that "freezes", "locks", or otherwise prevents the subsequent modification of that particular personality configuration for that storage device. As such, continuing with the specific example provided above, if a computing device is being manufactured based on an order from a country/jurisdiction that does not allow storage devices with security-locking-capable personality configuration discussed above, storage devices provided in that computing device may be provided the security-locking-incapable personality configuration, and the one-time programming operations may be performed to prevent subsequent modification of the security-locking-incapable personality configuration of those storage devices in order to ensure that those storage devices maintain compliance with the regulations of that country/jurisdiction. While not described in detail below, similar one-time programming operations may be performed on storage devices provided in a computing device with security-locking-capable personality configurations while remaining within the scope of the present disclosure as well. As such, computing device manufacturers may stock a single type of storage device, and may then configure any of those storage devices with security-locking-capable personality configurations or security-locking-incapable personality configurations depending on the country/jurisdiction for which the computing device they will be provided in was ordered, thus reducing the complexity of the computing device manufacturing process discussed above.

However, the inventors of the present disclosure have recognized that the one-time programming operations discussed above can raise some issues in the computing device manufacturing process. For example, in some situations, orders for computing devices may be cancelled subsequent to the performance of the one-time programming operations on the storage device(s) for those computing devices to provide the security-locking-incapable personality configurations discussed above, and those storage devices cannot be provided back in the "general" storage device stock/inventory for the computing device manufacturer. Instead, those storage devices with the security-locking-incapable personality configuration must be separated into a "security-locking-incapable personality configuration" storage device stock/inventory for the computing device manufacturer until needed for computing devices ordered from countries/jurisdictions that do not allow storage devices with the security-locking-capable personality configuration, or returned to the storage device manufacturer/vendor for re-manufacture such that they may be provided back in the "general" storage device stock/inventory for the computing device manufacturer.

Accordingly, it would be desirable to provide a one-time programming system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a one-time programming subsystem that is configured to: provide a first component with first personality configuration information that configures the first component to perform first component operations; and perform a one-time programming operation that configures a first component engine in the first component to deny modification requests to modify the first personality configuration information, and wherein the memory system includes instructions that, when executed by the processing system, cause the processing system to provide a one-time programming undo subsystem that is configured to: perform a one-time programming undo authentication operation; and transmit a one-time programming undo instruction that is associated with the one-time programming undo authentication operation to the first component, wherein the one-time programming undo authentication operation is configured to authenticate the one-time programming undo instruction to the first component such that the first component executes the one-time programming undo instruction that reconfigures the first component engine in the first component to allow modification requests to modify the first personality configuration information.

BRIEF DESCRIPTION OF THE DRAWINGS

FIG. 2 is a schematic view illustrating an embodiment of a computing device manufacturing system that may include the secure one-time programming undo system of the present disclosure.

FIG. 5 is a flow chart illustrating an embodiment of a method for securely undoing one-time programming.

FIG. 6B is a schematic view illustrating an embodiment of the computing device manufacturing system of the FIG. 2 operating during the method of FIG. 5.

FIG. 6E is a schematic view illustrating an embodiment of the computing device manufacturing system of the FIG. 2 operating during the method of FIG. 5.

FIG. 7 is a schematic view illustrating an embodiment of the storage device configuration system of the FIG. 4 operating during the method of FIG. 5.

FIG. 8A is a schematic view illustrating an embodiment of the storage device configuration system of the FIG. 4 operating during the method of FIG. 5.

FIG. 10B is a schematic view illustrating an embodiment of the computing device manufacturing system of the FIG. 2 operating during the method of FIG. 5.

FIG. 10C is a schematic view illustrating an embodiment of the storage device of the FIG. 3 operating during the method of FIG. 4.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
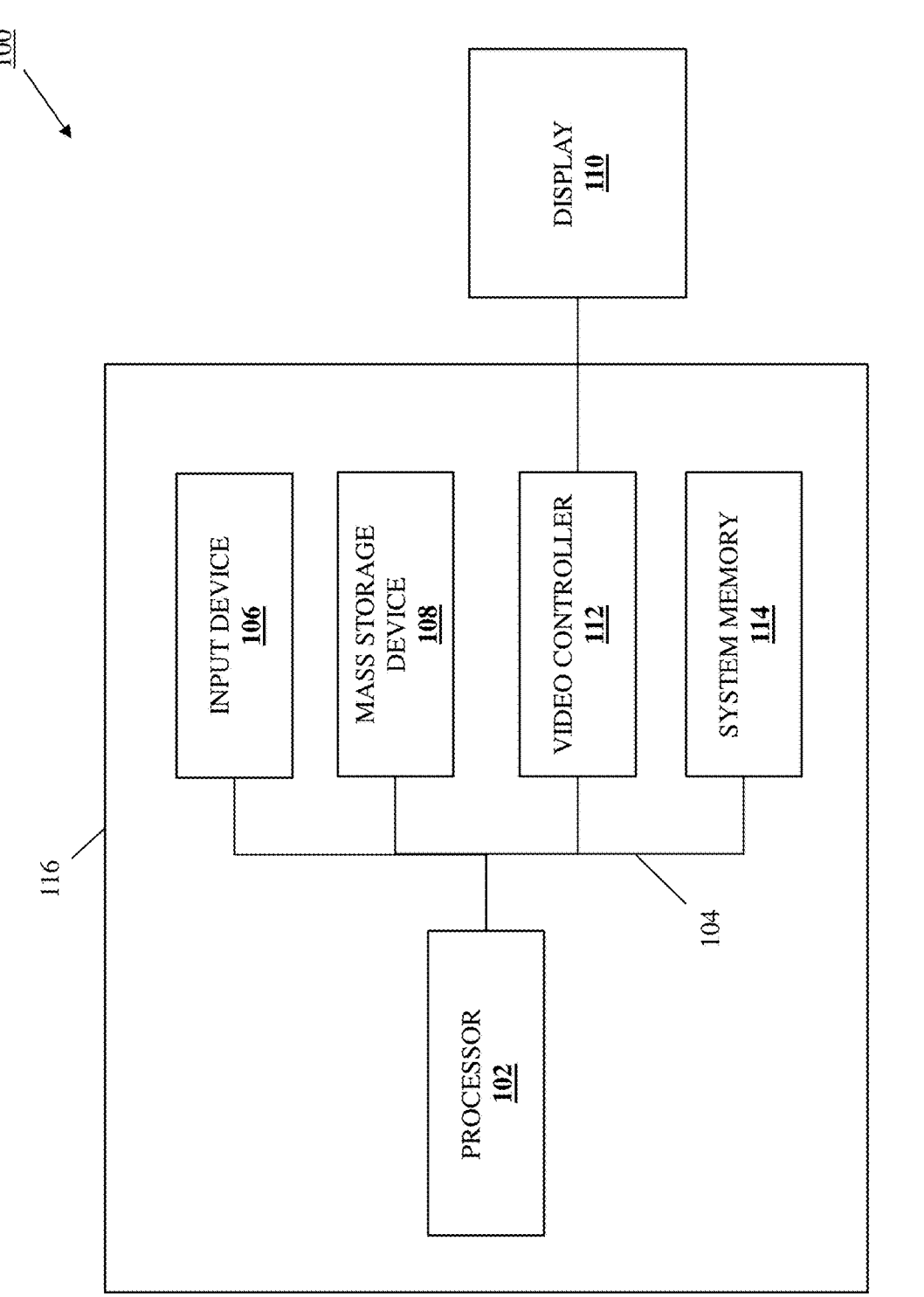
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Referring now to FIG. 2, an embodiment of a computing device manufacturing system 200 is illustrated that may utilize the secure one-time programming undo system of the present disclosure. In the illustrated embodiment, the computing device manufacturing system 200 includes a storage device configuration system 202 that is described below as performing the one-time programming operations and one-time programming undo operations of the present disclosure on storage devices, but one of skill in the art in possession of the present disclosure will appreciate how the storage device configuration system 202 may be replaced by component configuration systems that are configured to perform the one-time programming operations and one-time programming undo operations of the present disclosure on components other than storage devices while remaining within the scope of the present disclosure as well. In an embodiment, the storage device configuration system 202 may be provided by the IHS 100 discussed above with reference to FIG. 1, and/or may include some or all of the components of the IHS 100, and in specific examples may include one or more server devices. However, while illustrated and discussed as being provided by server device(s), one of skill in the art in possession of the present disclosure will recognize that storage device configuration systems provided in the computing device manufacturing system 200 may include any devices that may be configured to operate similarly as the storage device configuration system 202 discussed below.

FIG. 2 illustrates the storage device configuration system 202 coupled to a plurality of computing device 204, 206, and up to 208, and one of skill in the art in possession of the present disclosure will appreciate how the computing devices 204-208 may be any computing devices that are being manufactured using the computing device manufacturing system 200. In an embodiment, any of the computing devices 204-208 may be provided by the IHS 100 discussed above with reference to FIG. 1, and/or may include some or all of the components of the IHS 100, and in specific examples may be provided by server devices being manufactured using the computing device manufacturing system 200 (e.g., server chassis being configured with server components and having those server components configured to perform any of a variety of server functionality known in the art). However, while illustrated and described as being provided by server devices, one of skill in the art in possession of the present disclosure will appreciate how the computing devices 204-208 may be provided by other devices while remaining within the scope of the present disclosure as well. In the illustrated embodiment, each computing device is illustrated as including a controller subsystem and one or more storage devices, with the computing device 204 including a controller subsystem 204a and storage device(s) 204b, the computing device 206 including a controller subsystem 206a and storage device(s) 206b, and the computing device 208 including a controller subsystem 208a and storage device(s) 208b.

As discussed below, any of the controller subsystems 204a, 206a, and up to 208a may be provided by an integrated DELL® Remote Access Controller (IDRAC) device provided in server devices available from DELL® Inc. of Round Rock, Texas, United States; a Baseboard Management Controller (BMC) device; a host engine provided by a host processing system (e.g., a Central Processing Unit (CPU)) and host memory system (e.g., Dynamic Random Access Memory (DRAM)) in the computing device, and/or other controller subsystems that would be apparent to one of skill in the art in possession of the present disclosure. Furthermore, while the storage device(s) 204b, 206b, and 208b are illustrated and described as being subject to the one-time programming operations and one-time programming undo operations discussed below, one of skill in the art in possession of the present disclosure will appreciate how the storage device(s) 204b, 206b, and 208b may be replaced by other components that may then be subjected to the one-time programming operations and one-time programming undo operations discussed below while remaining within the scope of the present disclosure as well.

Furthermore, while the one-time programming operations and one-time programming undo operations are illustrated and described as being performed on storage devices/components included in computing devices via controller subsystems in those computing devices, one of skill in the art in possession of the present disclosure will appreciate how the one-time programming operations and one-time programming undo operations may be performed directly on storage devices either included in or outside of computing devices, with or without the use of controller subsystems, and/or in other manners that will fall within the scope of the present disclosure as well. As such, while a specific computing device manufacturing system 200 has been illustrated and described, one of skill in the art in possession of the present disclosure will recognize that the secure one-time programming undo system of the present disclosure may be implemented in a variety of other systems while remaining within the scope of the present disclosure as well.

Figure 3:
FIG. 3 is a schematic view illustrating an embodiment of a storage device that may be utilized with the secure one-time programming undo system of the present disclosure.

Referring now to FIG. 3, an embodiment of a storage device 300 is illustrated that may be utilized with the secure one-time programming undo system of the present disclosure. As such, the storage device 300 may be provided in the IHS 100 discussed above with reference to FIG. 1 (e.g., as the storage device 108), and in specific examples may include a Solid-State Drive (SSD) storage device. However, while illustrated and discussed as being provided by a particular type of storage device, one of skill in the art in possession of the present disclosure will recognize that the storage device 300 discussed below may be provided by other types of storage devices and/or other types of components while remaining within the scope of the present disclosure as well. In the illustrated embodiment, the storage device 300 includes a chassis 302 that houses the components of the storage device 300, only some of which are illustrated and discussed below. For example, the chassis 302 may house a storage processing system (not illustrated, but which may be similar to the processor 102 discussed above with reference to FIG. 1) and a storage memory system (not illustrated, but which may be similar to the memory 114 discussed above with reference to FIG. 1) that is coupled to the storage processing system and that includes instructions that, when executed by the storage processing system, cause the storage processing system to provide a storage engine 304 that is configured to perform the functionality of the storage device engines (e.g., storage device firmware) and/or storage devices discussed below.

The chassis 302 may also house a secure memory system 306 that is coupled to the storage device engine 304 (e.g., via a coupling between the secure memory system 306 and the storage processing system). As will be appreciated by one of skill in the art in possession of the present disclosure, the secure memory system 306 may include one or more memory subsystems that may be reserved for the personality configuration information and/or personality configuration lock/unlock settings discussed below, and the storage device engine 304 (e.g., storage device firmware) may be configured to prevent access to the secure memory system 306 by, for example, a host engine in the computing device (e.g., a host CPU) that includes the storage device 300, other host components, and/or any other unauthorized subsystems that would be apparent to one of skill in the art in possession of the present disclosure. For example, information, settings, and/or other data stored in the secure memory system 306 may be secured in the storage device 300 by configuring the secure memory system 306 and the storage device engine 304 such that the secure memory system is only accessible (e.g., only readable, writable, erasable, and/or subject to other memory operations) by the storage device engine 304, and one of skill in the art in possession of the present disclosure will recognize that a variety of security techniques for providing the secure memory system of the present disclosure will fall within its scope. However, while specific security features of the secure memory system 306 have been described, one of skill in the art in possession of the present disclosure will appreciate how the one-time programming undo system of the present disclosure may utilize other security techniques and/or the secure memory system 206 may include other security features in order to secure the information, settings, and/or other data described below as being stored in the secure memory system 206 while remaining within the scope of the present disclosure.

The chassis 302 may also house a communication system 308 that is coupled to the storage device engine 304 (e.g., via a coupling between the communication system 308 and the processing system) and that may be provided by any of a variety of storage device communication components that would be apparent to one of skill in the art in possession of the present disclosure. However, while a specific storage device 300 has been illustrated and described, one of skill in the art in possession of the present disclosure will recognize that storage devices (or other components operating according to the teachings of the present disclosure in a manner similar to that described below for the storage device 300) may include a variety of subsystems and/or component configurations for providing conventional storage device/component functionality, as well as the one-time programing and one-time programming undo functionality discussed below, while remaining within the scope of the present disclosure as well.

Figure 4:
FIG. 4 is a schematic view illustrating an embodiment of a storage device configuration system that may provide the secure one-time programming undo system of the present disclosure.

Referring now to FIG. 4, an embodiment of a storage device configuration system 400 is illustrated that may provide the storage device configuration system 202 discussed above with reference to FIG. 2. Similarly as discussed above, while the storage device configuration system 400 is described below as performing the one-time programming operations and one-time programming undo operations on storage devices, one of skill in the art in possession of the present disclosure will appreciate how the storage device configuration system 400 may be replaced by component configuration systems that are configured to perform the one-time programming operations and one-time programming undo operations on components other than storage devices while remaining within the scope of the present disclosure as well.

Similarly as discussed above, the storage device configuration system 202 may be provided by the IHS 100 discussed above with reference to FIG. 1 and/or may include some or all of the components of the IHS 100, and in specific examples may be provided by one or more server devices. However, while illustrated and discussed as being provided by server device(s), one of skill in the art in possession of the present disclosure will recognize that the functionality of the storage device configuration system 400 discussed below may be provided by other devices that are configured to operate similarly as the storage device configuration system 400 discussed below. In the illustrated embodiment, the storage device configuration system 400 includes a chassis 402 that houses the components of the storage device configuration system 400, only some of which are illustrated and discussed below.

For example, the chassis 402 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a one-time programming engine 404a that is configured to perform the functionality of the one-time programming engines and/or storage device configuration systems discussed below. Furthermore, the memory system includes instructions that, when executed by the processing system, cause the processing system to provide a one-time programming undo engine 404b that is configured to perform the functionality of the one-time programming undo engines and/or storage device configuration systems discussed below. Furthermore, while the one-time programming engine 404a and the one-time programming undo engine 404b are illustrated as separate engines, one of skill in the art in possession of the present disclosure will appreciate how the one-time programming engine 404a and the one-time programming undo engine 404b may be integrated as a single engine while remaining within the scope of the present disclosure as well.

The chassis 402 may also house a storage system (not illustrated, but which may include the storage 108 discussed above with reference to FIG. 1) that is coupled to the one-time programming engine 404a and the one-time programming undo engine 404*b* (e.g., via a coupling between the storage system and the processing system) and that includes a one-time programming database 406*a* that may be coupled to both of the one-time programming engine 404*a* and the one-time programming undo engine 404*b* and configured to store any of the information utilized by the one-time programming engine 404*a* discussed below, and a one-time programming undo database 406*b* that may be coupled to both of the one-time programming engine 404*a* and the one-time programming undo engine 404*b* and that is configured to store any of the information utilized by the one-time programming undo engine 404*b* discussed below. Furthermore, while the one-time programming database 406*a* and the one-time programming undo database 406*b* are illustrated as separate databases, one of skill in the art in possession of the present disclosure will appreciate how the one-time programming database 406*a* and the one-time programming undo database 406*b* may be integrated as a single database while remaining within the scope of the present disclosure as well. As will be appreciated by one of skill in the art in possession of the present disclosure, the one-time programming database 406*a* and one-time programming undo database 406*b* may be secure databases that are only accessible in the computing device manufacturing system 200 (e.g., only accessible by authenticated subsystems in the computing device factory).

The chassis 402 may also house a communication system 408 that is coupled to the one-time programming engine 404*a* and the one-time programming undo engine 404*b* (e.g., via a coupling between the communication system 408 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. However, while a specific storage device configuration system 400 has been illustrated and described, one of skill in the art in possession of the present disclosure will recognize that storage device configuration systems may include a variety of components and/or component configurations for providing conventional storage device configuration functionality, as well as the functionality discussed below, while remaining within the scope of the present disclosure as well.

Referring now to FIG. 5, an embodiment of a method 500 for securely undoing one-time programming is illustrated. As discussed below, the systems and methods of the present disclosure provide for the secure undoing of one-time programming of components that have previously had their personality configurations locked, frozen, or otherwise prevented from modification, thus allowing the modification of those personality configuration in authorized situations. For example, the secure one-time programming undo system of the present disclosure may include a component and a component configuration system. A one-time programming subsystem in the component configuration system provides the component with personality configuration information that configures the component to perform component operations, and performs a one-time programming operation that configures a component engine in the component to deny modification requests to modify the personality configuration information. A one-time programming undo subsystem in the component configuration system performs a one-time programming undo authentication operation, and transmits a one-time programming undo instruction that is associated with the one-time programming undo authentication operation to the component, with the one-time programming undo authentication operation configured to authenticate the one-time programming undo instruction to the component such that the component executes the one-time programming undo instruction that reconfigures the component engine in the component to allow modification requests to modify the personality configuration information. As such, the one-time programming of a component may be undone to allow that component to be restocked for subsequent one-time programming in a computing device manufacturing system.

Figure 6A:
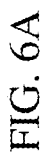
FIG. 6A is a schematic view illustrating an embodiment of the storage device configuration system of the FIG. 4 operating during the method of FIG. 5.

The method 500 begins at block 502 where a one-time programming subsystem provides a component with personality configuration information to configure the component to perform component operations. With reference to FIG. 6A, in an embodiment of block 502, the one-time programming engine 404*a* in the storage device configuration system 400 may perform personality configuration information retrieval operations 600 that include retrieving personality configuration information for component(s) being provided in computing devices being manufactured, and while those components are described below as being provided by storage devices, one of skill in the art in possession of the present disclosure will appreciate how personality configuration information may be retrieved for other components during their manufacture while remaining within the scope of the present disclosure as well.

In the specific examples provided below, the personality configuration information is storage device personality configuration information, and may include information for security-locking-incapable personality configurations for storage devices being provided in computing devices being manufactured for import, sale, or use in countries and/or jurisdictions that do not allow storage devices with security-locking-capable personality configurations, and information for security-locking-capable personality configurations for storage devices being provided in computing devices being manufactured for import, sale, or use in countries and/or jurisdictions that allow storage devices with security-locking-capable personality configurations. In such an example, the personality configuration information retrieval operations 600 may include identifying a computing device that is being manufactured and that will include a storage device as having been ordered for import, sale, or other use in a country and/or jurisdiction that does not allow storage devices with security-locking-capable personality configurations and, in response, retrieving the information for the security-locking-incapable personality configuration.

Similarly, the personality configuration information retrieval operations 600 may include identifying a computing device that is being manufactured and that will include a storage device as having been ordered for import, sale, or other use in a country and/or jurisdiction that allows storage devices with security-locking-capable personality configurations and, in response, retrieving the information for the security-locking-capable personality configuration. However, as discussed below, storage devices may be stocked in the computing device manufacturing system 200 after having been provided the security-locking-capable personality configuration and, in such a situation, when a computing device being manufactured includes a storage device and is identified as being ordered for import, sale, or other use in a country and/or jurisdiction that allows storage devices with security-locking-capable personality configurations, the retrieving the information for the security-locking-capable personality configuration may not need to be performed (i.e., because the stock of storage devices are already configured with the security-locking-capable personality configuration and thus are ready for provisioning in computing devices being manufactured for import, sale, or other use in a country and/or jurisdiction that allows storage devices with security-locking-capable personality configurations).

However, while particular personality configurations for storage devices are described, one of skill in the art in possession of the present disclosure will appreciate how different personality configurations may be used to configure storage devices (or other components) with "channel"/industry standard firmware or computing-device-manufacturer unique firmware, different NAND over-provisioning characteristics (e.g., which define how excess NAND devices are used when other NAND devices in a storage device fail, and which may provide for different real-world use capacities for a storage device depending on the personality configuration used), different temperature-environment-optimized performance (e.g., that optimize the operation of the storage device for either datacenter environments or telecommunications/edge environments), etc.

Figure 6C:
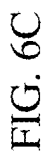
FIG. 6C is a schematic view illustrating an embodiment of the storage device of the FIG. 3 operating during the method of FIG. 5.

With continued reference to FIG. 6A, as well as to FIGS. 6B and 6C, the one-time programming engine 404a in the storage device configuration system 202/400 may perform personality configuration provisioning operations 602 that include using the personality configuration information retrieved as discussed above to provide, via its communication system 408, personality configurations for the storage device(s) 204b, 206b, and/or 208b in any of the computing devices 204 206, and/or 208. In the embodiment of FIG. 6B, the personality configurations are provided for each of the storage device(s) 204b, 206b, and/or 208b via the controller subsystem 204a, 204b, and 204c, respectively, in each of the computing devices 204 206, and/or 208, respectively. However, as discussed above, the personality configurations may be provided for each of the storage device(s) 204b, 206b, and/or 208b without the need for the controller subsystem in their respective computing devices while remaining within the scope of the present disclosure as well.

As illustrated in FIG. 6C, the personality configuration provisioning operations 602 that provide of the personality configuration in a storage device 300 (which may be any of the storage devices 204b, 206b, and/or 208b) may be performed via the communication system 308 (and in some cases the storage device engine 304), and may provide the personality configuration information 604 retrieved by the storage device configuration system 202/400 in the secure memory system 306 of the storage device 300. Continuing with the examples above, the personality configuration provided for the storage device 300 at block 502 may include a security-locking-capable personality configuration or a security-locking-incapable personality configuration. As discussed above, in some embodiments, storage devices may be stocked in the computing device manufacturing system 200 as storage devices that have been provided the security-locking-capable personality configuration discussed above, and thus the personality configuration provisioning operations 602 may not be required for storage devices that are being provided in computing devices being manufactured for countries and/or jurisdictions that allow the security-locking-capable personality configuration (i.e., because those storage devices are already configured with the security-locking-capable personality configuration).

As will be appreciated by one of skill in the art in possession of the present disclosure, the programming of a storage device with a security-locking-capable personality configuration may include providing the personality configuration information 604 in the secure memory system 306 of the storage device 300 in order to configure the storage device engine 304 to respond to Trusted Computing Group (TCG) Opal protocol commands that one of skill in the art in possession of the present disclosure will appreciate provide for a variety of storage device security locking functionality (e.g., data encryption functionality), while the programming of a storage device with a security-locking-incapable personality configuration may include providing the personality configuration information 604 in the secure memory system 306 that configures the storage device engine 304 to not respond to TCG Opal protocol commands in order to prevent the use of associated storage device security locking functionality. However, while a specific security locking protocol is described as being utilized to configure storage device as security-locking-capable or security-locking-incapable, one of skill in the art in possession of the present disclosure will appreciate how different security locking capabilities or other personality configurations may be provided in storage devices (or other components) while remaining within the scope of the present disclosure as well. As such, following block 502, the different storage device(s) 204b, 206b, and 208b in the computing devices 204, 206, and 208 are configured with different personality configurations.

Figure 6D:
FIG. 6D is a schematic view illustrating an embodiment of the storage device configuration system of the FIG. 4 operating during the method of FIG. 5.

The method 500 then proceeds to block 504 where the one-time programming subsystem performs a one-time programming operation that configures a component engine in the component to deny modification requests to modify personality configuration information. With reference to FIG. 6D, in an embodiment of block 504, the one-time programming engine 404a in the storage device configuration system 400 may perform one-time programming undo information retrieval operations 606 that include retrieving one-time programming undo information for the component(s) that were provided with the personality configurations at block 502 and that are being provided in computing devices being manufactured in the computing device manufacturing system 200. As discussed in further detail below, the one-time programming undo operations discussed below may include the use of one-time programming undo authentication information (e.g., a multi-byte undo code), and in some embodiments that one-time programming undo authentication information may be retrieved from the one-time programming database 406a as part of the one-time programming operations. That one-time programming undo authentication information may then be stored in the one-time programming undo database 406b (e.g., in association with a serial number or other identifier for the storage device for which it was retrieved).

However, in other embodiments, the one-time programming undo authentication information used as discussed below may be generated by the one-time programming engine 404a as part of the one-time programming operations (e.g., as a random, multi-byte code that is unique to the storage device it is generated for), and then stored in the one-time programming undo database 406b (e.g., in association with a serial number or other identifier for the storage device for which it was generated), along with being provided in storage devices as discussed below. In yet other embodiment, one-time programming undo authentication information may include any information that may be utilized to provide the authenticated communication sessions described below. However, while several examples of one-time programming undo authentication information have been provided, one of skill in the art in possession of the present disclosure will appreciate how a variety of different one-time programming undo authentication information may enable the functionality described below, and thus the retrieval of (or generation and storage of) that information will fall within the scope of the present disclosure as well.

Figure 6F:
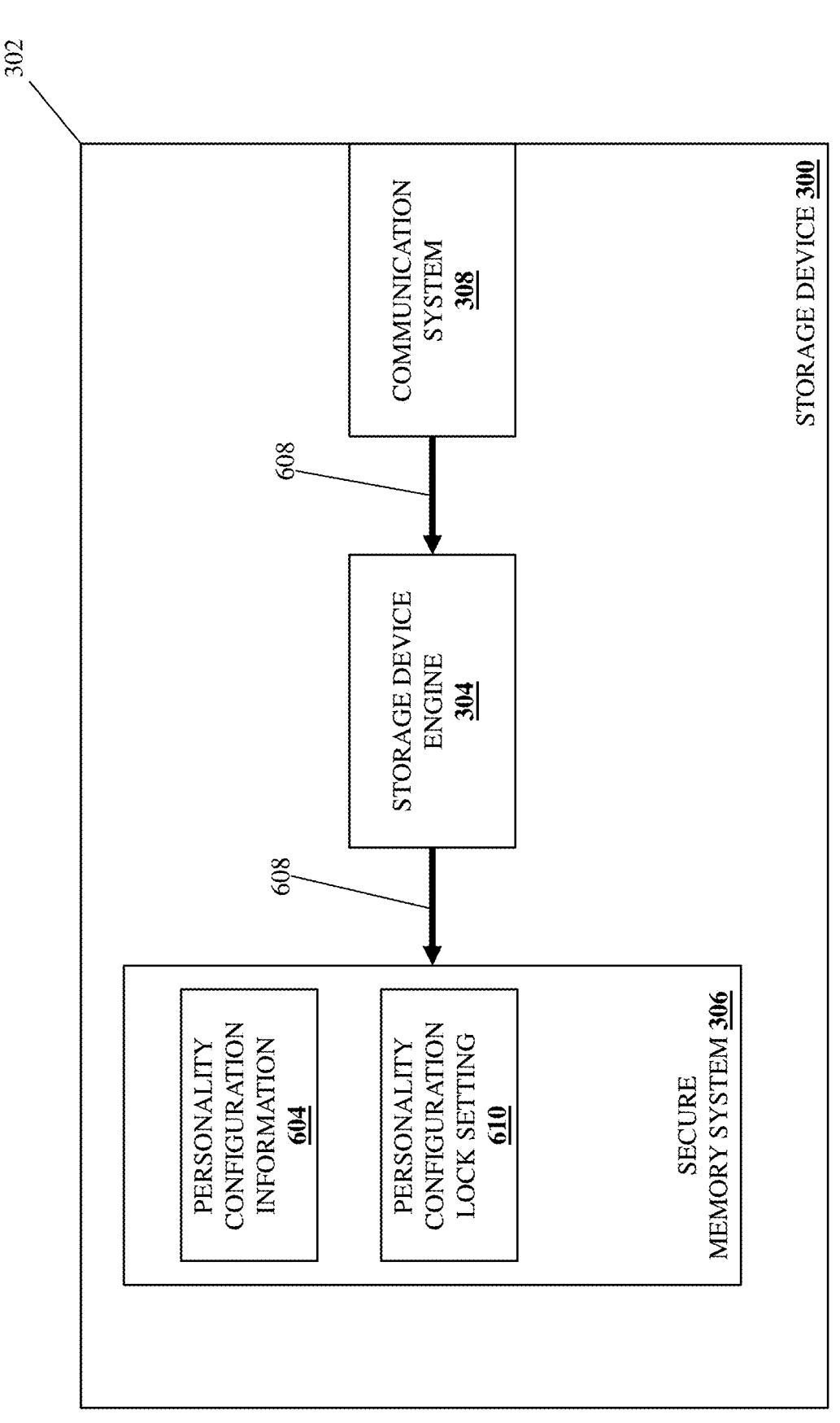
FIG. 6F is a schematic view illustrating an embodiment of the storage device of the FIG. 3 operating during the method of FIG. 5.

With continued reference to FIG. 6D, as well as FIGS. 6E and 6F, the one-time programming engine 404a in the storage device configuration system 202/400 may perform one-time programming operations 608 that include one-time programming, via its communication system 408, the storage device(s) 204b, 206b, and/or 208b in any of the computing devices 204 206, and/or 208 in order to lock, freeze, or otherwise prevent modification of the personality configurations provided for those storage devices at block 502. In the embodiment of FIG. 6E, the one-time programming operations 608 are performed for each of the storage device(s) 204b, 206b, and/or 208b via the controller subsystem 204a, 204b, and 204c, respectively, in each of the computing devices 204 206, and/or 208, respectively. However, as discussed above, the one-time programming operations may be performed for each of the storage device(s) 204b, 206b, and/or 208b without the need for the controller subsystem in their respective computing devices while remaining within the scope of the present disclosure as well.

As illustrated in FIG. 6F, the one-time programming operations 608 that one-time program a storage device 300 (which may be any of the storage devices 204b, 206b, and/or 208b) may be performed via the communication system 308 (and in some cases the storage device engine 304) and may provide a personality configuration lock setting 610 in the secure memory system 306. For example, the personality configuration lock setting 610 provided in the secure memory system 306 may be any data, information, instruction, or other setting in the secure memory system 306 that configures the storage device engine 304 (e.g., storage device firmware 304 for the storage device 300) to deny modification requests that request modification to the personality configuration information 604 provided in the security memory system 306 (and thus prevent modification of the personality configuration for the storage device 300).

As discussed, some of the inventors of the present disclosure describe techniques for performing the one-time programming discussed above in U.S. patent application Ser. No. 16/863,668, filed on Apr. 30, 2020, the disclosure of which is incorporated by reference herein in its entirety. As such, block 504 of the method 500 discussed above may be performed substantially as described in that patent document, with the exception of the retrieval of the one-time programming undo information via the one-time programming undo information retrieval operations 606 in some of the embodiments discussed above. As discussed below, in embodiments of the present disclosure, one-time programming undo operations may be performed using one-time programming undo information provided in the storage device 300 during one-time programming operations (e.g., block 504 of the method 500). As such, embodiments of block 504 of the method 500 may include providing the one-time programming undo information discussed above in the storage device 300 as part of the one-time programming operations 608. For example, along with a "lock" command that one-time programs the storage device 300 as discussed above, the one-time programming undo information may be provided as a multi-byte code that may be stored in the secure memory system 306 of the storage device 300.

In another example, the one-time programming undo information may enable the authenticated communication sessions discussed below, and thus the secure provisioning of that one-time programming undo information in any of the controller subsystems 204a, 206a, 208a and/or the storage device(s) 204b, 206b, and 208b will fall within the scope of the present disclosure as well. In yet another example, the one-time programming undo information that enables the authenticated communication sessions discussed below may be provided on the storage device(s) 204b, 206b, and 208b by their respective storage device manufacturer(s) by, for example, providing a certificate chain on the storage device (e.g., in the storage device factory), which one of skill in the art in possession of the present disclosure will recognize allows the controller subsystem used with that storage device to read that certificate chain and compare it to a root certificate authority in order to enable the authenticated communication sessions discussed below.

Thus, following block 504, any of the storage device(s) 204b, 206b, and/or 208b may have their personality configured and locked, frozen, or otherwise prevented from subsequent modification. As such, computing devices 204, 206, and/or 208 manufactured for import, sale, or use in countries and/or jurisdictions that do not allow security-locking-capable storage devices will have their storage devices configured with security-locking-incapable personality configurations, and with those security-locking-incapable personality configurations locked in those storage devices such that the storage device engine (e.g., storage device firmware) in those storage devices will deny modification requests that request the modification of those security-locking-incapable personality configurations in those storage devices (i.e., to prevent those storage devices from being modified with security-locking-capable personality configurations that would then allow them to perform secure locking functionality not allowed in the country and/or jurisdiction in which their computing device is eventually imported, sold, or used).

The method 500 then proceeds to decision block 506 where the method proceeds depending on whether a one-time programming undo operation is required for a component. In an embodiment, a one-time programming undo operation may be required for a component at decision block 506 following the one-time programming operations discussed above when an order for a computing device that includes that component is cancelled. As such, in the examples below, a customer may order a computing device for import, sale, or use in a country and/or jurisdiction that does not allow security-locking-capable storage devices, followed by the manufacture of that computing device that includes the configuration of storage device(s) in that computing device with a security-locking-incapable personality configuration, and then the one-time programming of those storage device(s) to prevent subsequent modification of the security-locking-incapable personality configuration of those storage device(s). Subsequently, if the customer cancels the order for that computing device, a one-time programming undo operation may be required at decision block 506. However, while a specific scenario has been described that results in the need for a one-time programming undo operation for a component, one of skill in the art in possession of the present disclosure will appreciate how other scenarios may require one-time programming undo operations for components while remaining within the scope of the present disclosure as well. If, at decision block 506, a one-time programming undo operation is not required for a component, the method 500 returns to block 502. As such, the method 500 may loop such that components are provided with personality configurations and one-time programmed until a one-time programming undo operation is required.

If, at decision block 506, a one-time programming undo operation is required for a component, the method 500 proceeds to block 508 where a one-time programming undo subsystem performs a one-time programming undo authentication operation. Continuing with the example discussed above, the order for the computing device 206 including the storage device(s) that were configured with the security-locking-incapable personality configuration discussed above may be cancelled, and thus a one-time programming undo operation for those storage device(s) 206b may be required at decision block 506. With reference to FIG. 7, in an embodiment of block 508, the storage device(s) 206b may be coupled to the storage device configuration system 202 by coupling the computing device 206 to the storage device configuration system 202. However, one of skill in the art in possession of the present disclosure will appreciate how the storage device(s) 206 may be coupled to the storage device configuration system 202 for one-time programming undo operations without the computing device 206 while remaining within the scope of the present disclosure.

The storage device configuration system 202 may then perform a one-time programming undo authentication operation. With reference to FIG. 8A, in one embodiment of one-time programming undo authentication operations at block 508, the one-time programming undo engine 404b may perform one-time programming authentication information retrieval operations 800 that include retrieving one-time programming authentication information from the one-time programming undo database 406b. As discussed above, respective one-time programming authentication information retrieved at block 508 may have been provided in each of the storage device(s) 206b (e.g., a random, multi-byte code unique to each storage device 206b) during the one-time programming operations at block 504, as well as associated with each of the storage device(s) 206b (e.g., associated with a respective serial number or other identifier for each of the storage device(s) 206b) in the one-time programming undo database 406b. As such, at block 508, a respective identifier (e.g., a serial number) for each of the storage device(s) 206b may be retrieved and used to identify the corresponding one-time programming authentication information (e.g., a random, multi-byte code unique to the storage device 206b) in the one-time programming undo database 406b.

Figure 8B:
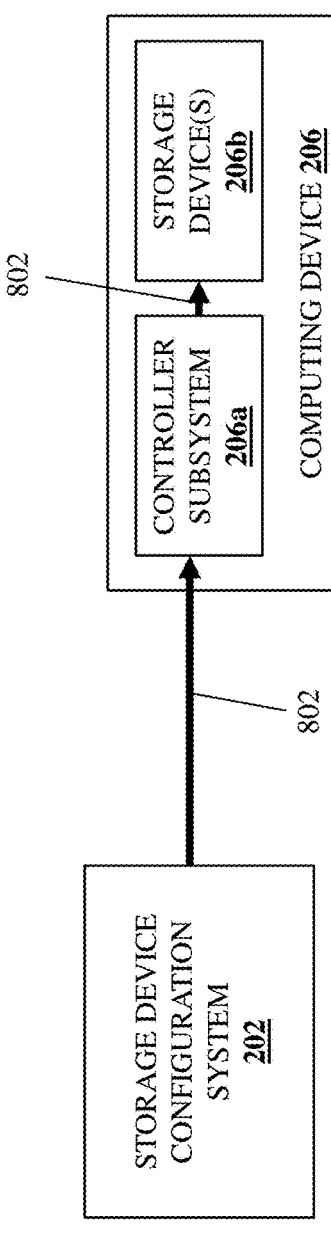
FIG. 8B is a schematic view illustrating an embodiment of the computing device manufacturing system of the FIG. 2 operating during the method of FIG. 5.

With reference to FIGS. 8A and 8B, and continuing with this embodiment of block 508, the one-time programming undo engine 404b may perform one-time programming authentication information provisioning operations 802 to transmit the respective one-time programming authentication information via its communication system 408 and to each the storage device(s) 206b. In the embodiment illustrated in FIG. 8B, the respective one-time programming authentication information is provided to each of the storage device(s) 206b via the controller subsystem 206a in the computing devices 206. However, as discussed above, the one-time programming authentication information may be provided for each of the storage device(s) 206b without the need for the controller subsystem in the computing device 206 while remaining within the scope of the present disclosure as well.

Figure 8C:
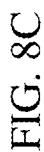
FIG. 8C is a schematic view illustrating an embodiment of the storage device of the FIG. 3 operating during the method of FIG. 4.

With reference to FIG. 8C, and continuing with this embodiment of block 508, the one-time programming authentication information provisioning operations 802 may include the storage device engine 304 in the storage device 300 (which may be any of the storage device(s) 206b) receiving the one-time programming authentication information from the storage device configuration system 202/400. The storage device engine 304 in the storage device 300 (which may be any of the storage device(s) 206b) may then perform one-time programming authentication information authentication operations 804 that may include comparing the one-time programming authentication information received from the storage device configuration system 202/400 with the one-time programming authentication information that was stored in the secure memory system 306 during the one-time programming operations discussed above with reference to block 504. For example, in this embodiment of block 508, the storage device engine 304 in the storage device 300 may compare a multi-byte code received from the storage device configuration system 202/400 with the multi-byte code that was provided in the secure memory system 306 by the storage device configuration system 202/400 during the one-time programming operations discussed above with reference to block 504.

Figure 9A:
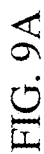
FIG. 9A is a schematic view illustrating an embodiment of the storage device configuration system of the FIG. 4 operating during the method of FIG. 5.
Figure 9B:
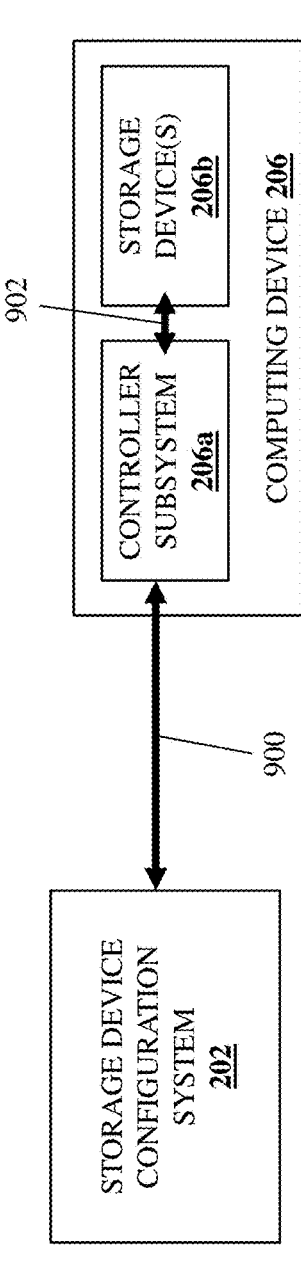
FIG. 9B is a schematic view illustrating an embodiment of the computing device manufacturing system of the FIG. 2 operating during the method of FIG. 5.
Figure 9C:
FIG. 9C is a schematic view illustrating an embodiment of the storage device of the FIG. 3 operating during the method of FIG. 4.

With reference to FIGS. 9A, 9B, and 9C, in another embodiment of one-time programming undo authentication operations at block 508, the one-time programming undo engine 404b in the storage device configuration system 202/400 may establish a first authenticated communication session 900 with the controller subsystem 206a in the computing device 206, while the controller subsystem 206a in the computing device 206 may establish a second authenticated communication session 902 with the storage device engine 304 in each of the storage device(s) 206b/300 in the computing device 206. For example, the first authenticated communication session 900 may be established between the storage device configuration system 202/400 in the computing device manufacturing system 200 and the controller subsystem 206a in the computing device 206 using certificates, challenge/response techniques, and/or other authenticated communication session operations (as well as using any of the one-time programming undo authentication information discussed above). Furthermore, the second authenticated communication session 902 may be established between the controller subsystem 206a in the computing device 206 and the storage device engine 304 in the storage device(s) 206b/300 in the computing device using Security Protocol and Data Model (SPDM) techniques and/or other authenticated communication session operations (as well as using any of the one-time programming undo authentication information discussed above).

To provide a specific example of this embodiment of the one-time programming undo authentication operations at block 508. The one-time programming undo engine 404b in the storage device configuration system 202/400 may establish the first authenticated communication session 900 with the controller subsystem 206a (e.g., an iDRAC device as discussed above) in order to allow the controller subsystem 206a to cryptographically verify that it is in a computing device manufacturing system environment (e.g., a "factory environment"), and the controller subsystem 206a may be configured with an Application Programming Interface (API) for performing the one-time programming undo operations described herein on storage devices. As such, and as discussed in further detail below, the controller subsystem 206a may authenticate the one-time programming undo requests discussed below by only accepting those requests if they are received via that first authenticated communication session 900, e.g., when then controller subsystem 206a authenticates it is in a factory environment. In some embodiments, the second authenticated communication session 902 may only be established by the controller subsystem 206a after the one-time programming undo requests discussed below have been accepted/received via the first authenticated communication session 900. Furthermore, one of skill in the art in possession of the present disclosure will appreciate how the storage device engine 304 in a storage device 206*b*/300 may authenticate the one-time program-
ming undo requests discussed below by only accepting those
requests if they are received via that second authenticated
communication session 902 from the controller subsystem
206*a*, e.g., when then storage device engine 304 authenti-
cates it is in a factory environment.

However, while specific examples of the one-time pro-
gramming undo authentication operations at block 508 using
multiple authenticated communications sessions with a con-
troller subsystem have been described, one of skill in the art
in possession of the present disclosure will appreciate how
other authenticated-communication-session-based one-time
programming undo authentication operations will fall within
the scope of the present disclosure as well. For example, the
controller subsystem 206*b* (e.g., an iDRAC device as dis-
cussed above) may provide a "passthrough" interface
between the one-time programming undo engine 404*b* in the
storage device configuration system 202/400 and the storage
device engine 304 in a storage device 206*b*/300 that allows
the one-time programming undo engine 404*b* and the stor-
age device engine 304 to mutually authenticate with each
other using certificates, challenge/response techniques, and/
or other mutual authentication operations that would be
apparent to one of skill in the art in possession of the present
disclosure, subsequently allowing the storage device engine
304 in the storage device 206*b*/300 to authenticate the
one-time programming undo requests discussed below by
only accepting those requests from the one-time program-
ming undo engine 404*b* if they are received via an authen-
ticated communication session, e.g., when then storage
device engine 304 authenticates it is in a factory environ-
ment. However, while several specific examples of one-time
programming authentication operations have been
described, one of skill in the art in possession of the present
disclosure will appreciate how other one-time programming
authentication operations may fall within the scope of the
present disclosure as well.

Figure 10A:
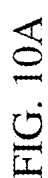
FIG. 10A is a schematic view illustrating an embodiment of the storage device configuration system of the FIG. 4 operating during the method of FIG. 5.

The method 500 then proceeds to block 510 where the
one-time programming undo subsystem transmits a one-
time programming undo instruction associated with the
one-time programming undo authentication operation to the
component. With reference to FIGS. 10A and 10B, in an
embodiment of block 510, the one-time programming undo
engine 404*b* in the storage device configuration system
202/400 may perform one-time programming undo instruc-
tion transmission operations 1000 that include transmitting
a one-time programming undo instruction, via its commu-
nication system 408, to each of the storage device(s) 206*b*.
FIG. 10B illustrates the one-time programming undo
instruction being transmitted by the storage device configu-
ration system 202 and through the controller subsystem
206*a* to the storage device(s) 206*b*, but similarly as dis-
cussed above, the one-time programming undo instruction
may be provided to each of the storage device(s) 206*b*
without the need for the controller subsystem 206*a* in the
computing device 206 while remaining within the scope of
the present disclosure as well. With reference to FIG. 10C,
the one-time programming undo instruction transmission
operations 1000 may include the storage device engine 304
in the storage device 300 (which may be any of the storage
device(s) 206*b*) receiving the one-time programming undo
instruction via its communication system 308.

The method 500 then proceeds to decision block 512
where it is determined whether the one-time programming
undo instruction has been authenticated. In an embodiment,
at decision block 512, the storage device engine 304 in the
storage device 300 (which may be any of the storage device(s) 206*b*) may perform one-time programming undo
instruction authentication operations that include authenti-
cating the one-time programming undo instruction received
at block 510 based on the one-time programming undo
authentication operations performed at block 508. Continu-
ing with the embodiment discussed above, the storage
device engine 304 in the storage device 300 may perform
one-time programming authentication information authenti-
cation operations 804 at block 508 by comparing the one-
time programming authentication information (e.g., a multi-
byte code) received from the storage device configuration
system 202/400 with the one-time programming authenti-
cation information (e.g., a multi-byte code) that was stored
in the secure memory system 306 during the one-time
programming operations discussed above with reference to
block 504, and in the event the one-time programming
authentication information received from the storage device
configuration system 202/400 matches the one-time pro-
gramming authentication information that was stored in the
secure memory system 306 during the one-time program-
ming operations discussed above with reference to block
504, the one-time programming undo instruction may be
authenticated.

As such, while illustrated and discussed as separate
blocks, one of skill in the art in possession of the present
disclosure will appreciate how, in some embodiments, the
one-time programming undo instruction and the one-time
programming authentication information may be transmitted
by the storage device configuration system 202/400 at the
same time, and/or received by the storage device 206*b* at the
same time, while remaining within the scope of the present
disclosure. Furthermore, a limited number of one-time pro-
gramming undo instruction/one-time programming authen-
tication information "attempts" may be allowed by the
storage device 206*b* in order to prevent guessing of the
one-time programming authentication information.

Continuing with another of the embodiments discussed
above, the first authenticated communication session 900
established between the one-time programming undo engine
404*b* in the storage device configuration system 202/400 and
the controller subsystem 206*a* in the computing device 206,
as well as the second authenticated communication session
902 established between the controller subsystem 206*b* in
the computing device 206 and the storage device engine 304
in the storage device 206*b*/300 in the computing device 206,
may allow a one-time programming undo instruction trans-
mitted via the first authenticated communication session 900
and the second authenticated communication session 902 to
be authenticated. For example, and as discussed above, the
controller subsystem 206*b* in the computing device 206 may
authenticate a one-time programming undo instruction
received from the one-time programming undo engine 404*b*
in the storage device configuration system 202/400 due to its
having been received via the first authenticated communi-
cation session 900, and then may establish the second
authenticated communication session 902 the storage device
engine 304 in the storage device 206*b*/300 in the computing
device 206 and transmit the one-time programming undo
instruction via the second authenticated communication
session 902, allowing the storage device engine 304 to
receive and authenticate the one-time programming undo
instruction due to its having been received via the second
authenticated communication session 902. However, as dis-
cussed above, the storage device engine 304 may receive
and authenticate a one-time programming undo instruction
provided by the one-time programming undo engine 404*b* in
the storage device configuration system 202/400 via the controller subsystem 206a acting as a "pass-through" device while remaining within the scope of the present disclosure as well.

If, at decision block 512, it is determined that the one-time programming undo instruction has not been authenticated, the method 500 proceeds to block 514 where the component prevents one-time programming undo operations. In an embodiment, at block 514 and in response to determining that a one-time programming undo instruction has been received without one-time programming authentication information (e.g., a multi-byte code) that matches one-time programming authentication information (e.g., a multi-byte code) stored in the secure memory system 306, or a one-time programming undo instruction has been received in a non-authenticated communication session, the storage device engine 304 in the storage device 206b/300 will prevent one-time programming undo operations. Furthermore, in response to receiving the one-time programming undo instruction and preventing the one-time programming undo operations, the storage device engine 304 may log a one-time programming undo operation prevention event in a database and generate an alert in order to, for example, identify a possible malicious attempt to undo the one-time programming of the storage device 300. As such, following block 514, the personality configuration lock setting 610 in the secure memory system 306 may remain such that the storage device engine 304 (e.g., storage device firmware 304 for the storage device 300) will deny modification requests that request modification to the personality configuration information 604 provided in the security memory system 306 (and thus prevent modification of the personality configuration for the storage device 300). The method 500 then returns to block 502.

If, at decision block 512, it is determined that the one-time programming undo instruction has been authenticated, the method 500 proceeds to block 516 where the component executes the one-time programming undo instruction to reconfigure the component engine in the component to allow modification requests to modify the personality configuration information. With continued reference to FIG. 10C, in an embodiment of block 516 and in response to authenticating the one-time programming instruction at decision block 512, the storage device engine 304 may perform one-time programming undo operations 1002 that include providing a personality configuration unlock setting 1004 in the secure memory system 306. For example, the personality configuration unlock setting 1004 provided in the secure memory system 306 may be any data, information, instruction, or other setting in the secure memory system 306 that configures the storage device engine 304 (e.g., storage device firmware 304 for the storage device 300) to allow modification requests that request modification to the personality configuration information 604 provided in the security memory system 306 (and thus allow modification of the personality configuration for the storage device 300). In embodiments that authenticate the one-time programming undo operations via the authenticated communication session(s) discussed above, those authenticated communication session(s) may be closed following the performance of an associated one-time programming undo operation. The method 500 then returns to block 502.

As such, following block 516, personality configuration information provisioning operations similar to those discussed above with reference to block 502 may be performed to modify the personality configuration information 604 in the secure memory system 306 of the storage device 300. Continuing with the example provided above, the personality configuration information 604 in the secure memory system 306 of the storage device 300 may be modified to change the personality configuration of the storage device 206b/300 from a security-locking-incapable personality configuration to a security-locking-capable personality configuration, which one of skill in the art in possession of the present disclosure will appreciate allows that storage device 206b/300 to be provided back in the "general" stock of storage devices (i.e., a stock/inventory of storage devices with security-locking-capable personality configurations in the example above).

In some embodiments that perform the one-time programming undo operations in the computing device manufacturing system/computing device factory, once the computing devices and their storage device(s) have been shipped, picked up, and/or otherwise provided to the customer, the one-time programming undo authentication information (e.g., the multi-byte undo code discussed above) may be purged, deleted, and/or otherwise removed from the one-time programming database 406a and/or one-time programming undo database 406b, which one of skill in the art in possession of the present disclosure will appreciate may prevent the undo operations on the storage devices at customer locations in the event of a security breach of the one-time programming database 406a and/or one-time programming undo database 406b.

Thus, systems and methods have been described that provide for the secure undoing of one-time programming of components that have previously had their personality configurations locked, frozen, or otherwise prevented from modification, thus allowing the modification of those personality configuration in authorized situations. For example, the secure one-time programming undo system of the present disclosure may include a component and a component configuration system. A one-time programming subsystem in the component configuration system provides the component with personality configuration information that configures the component to perform component operations, and performs a one-time programming operation that configures a component engine in the component to deny modification requests to modify the personality configuration information. A one-time programming undo subsystem in the component configuration system performs a one-time programming undo authentication operation, and transmits a one-time programming undo instruction that is associated with the one-time programming undo authentication operation to the component, with the one-time programming undo authentication operation configured to authenticate the one-time programming undo instruction to the component such that the component executes the one-time programming undo instruction that reconfigures the component engine in the component to allow modification requests to modify the personality configuration information. As the one-time programming of a component may be undone to allow that component to be restocked (e.g., as "new" components) for subsequent one-time programming in a computing device manufacturing system.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A secure one-time programming undo component, comprising:

a component including a component chassis;

a secure memory subsystem housed in the component chassis; and a component engine that is housed in the component chassis, that is coupled to the secure memory subsystem, and that is configured to:

receive, from a component configuration system, first personality configuration information;

provide the first personality configuration information in the secure memory subsystem to configure the component engine to perform first component operations;

receive, from the component configuration system, a first one-time programming instruction and first one-time programming undo information;

configure, in response to receiving the first one-time programming instruction, the secure memory subsystem to prevent modification to the first personality configuration information;

store the first one-time programming undo information in the secure memory subsystem;

receive, from the component configuration system subsequent to configuring the secure memory subsystem to prevent modification to the first personality configuration information, a one-time programming undo instruction;

authenticate, based on the first one-time programming undo information stored in the secure memory subsystem, the one-time programing undo instruction; and configure, in response to authenticating the first one-time programming instruction, the secure memory subsystem to allow modification to the first personality configuration information.

2. The system of claim 1, wherein the component engine is configured to:

receive, from the component configuration system subsequent to configuring the secure memory subsystem to allow modification to the first personality configuration information, second personality configuration information;

provide the second personality configuration information in the secure memory subsystem in place of the first personality configuration information to configure the component engine to perform second component operations that are different than the first component operations;

receive, from the component configuration system, a second one-time programming instruction and second one-time programming undo information;

configure, in response to receiving the second one-time programming instruction, the secure memory subsystem to prevent modification to the second personality configuration information; and store the second one-time programming undo information in the secure memory subsystem.

3. The system of claim 2, wherein the first component operations include encryption operations that prevent the reading and writing of data without authentication credentials, and wherein the second component operations allow the reading and writing of data without authentication credentials.

4. The system of claim 1, wherein the first one-time programming undo information is a first code that is stored in the secure memory subsystem, the one-time programming undo instruction includes a second code, and the one-time programing undo instruction is authenticated based on the second code matching the first code.

5. The system of claim 1, wherein the first one-time programming undo information is configured for use in enabling an authenticated communication session, and the one-time programing undo instruction is at least partially authenticated in response to being received via the authenticated communication session enabled using the first one-time programming undo information.

6. The system of claim 1, wherein the component is a storage device.

7. An Information Handling System (IHS), comprising:

a processing system; and a memory system that is coupled to the processing system and that includes instructions that, when executed by the processing system, cause the processing system to provide a component engine that is configured to:

receive, from a component configuration system that is coupled to the processing system, first personality configuration information;

provide the first personality configuration information in a secure memory subsystem that is coupled to the processing system to configure the component engine to perform first component operations;

receive, from the component configuration system, a first one-time programming instruction and first one-time programming undo information;

configure, in response to receiving the first one-time programming instruction, the secure memory subsystem to prevent modification to the first personality configuration information;

store the first one-time programming undo information in the secure memory subsystem;

receive, from the component configuration system subsequent to configuring the secure memory subsystem to prevent modification to the first personality configuration information, a one-time programming undo instruction;

authenticate, based on the first one-time programming undo information stored in the secure memory subsystem, the one-time programing undo instruction; and configure, in response to authenticating the first one-time programming instruction, the secure memory subsystem to allow modification to the first personality configuration information.

8. The IHS of claim 7, wherein the first component operations include encryption operations that prevent the reading and writing of data without authentication credentials.

9. The IHS of claim 7, wherein the component engine is configured to:

receive, from the component configuration system subsequent to configuring the secure memory subsystem to allow modification to the first personality configuration information, second personality configuration information;

provide the second personality configuration information in the secure memory subsystem in place of the first personality configuration information to configure the component engine to perform second component operations that are different than the first component operations;

receive, from the component configuration system, a second one-time programming instruction and second one-time programming undo information;

configure, in response to receiving the second one-time programming instruction, the secure memory subsystem to prevent modification to the second personality configuration information; and store the second one-time programming undo information in the secure memory subsystem.

10. The IHS of claim 9, wherein the second component operations allow the reading and writing of data without authentication credentials.

11. The IHS of claim 7, wherein the first one-time programming undo information is a first code that is stored in the secure memory subsystem, the one-time programming undo instruction includes a second code, and the one-time programing undo instruction is authenticated based on the second code matching the first code.

12. The IHS of claim 7, wherein the first one-time programming undo information is configured for use in enabling an authenticated communication session, and the one-time programing undo instruction is at least partially authenticated in response to being received via the authenticated communication session enabled using the first one-time programming undo information.

13. The IHS of claim 7, wherein the IHS is a storage device.

14. A method for securely undoing one-time programming of a component, comprising:

receiving, by a component from a component configuration system, first personality configuration information;

providing, by the component, the first personality configuration information in a secure memory subsystem to configure the component to perform first component operations;

receiving, by the component from the component configuration system, a first one-time programming instruction and first one-time programming undo information;

configuring, by the component in response to receiving the first one-time programming instruction, the secure memory subsystem to prevent modification to the first personality configuration information;

storing, by the component, the first one-time programming undo information in the secure memory subsystem;

receiving, by the component from the component configuration system subsequent to configuring the secure memory subsystem to prevent modification to the first personality configuration information, a one-time programming undo instruction;

authenticating, by the component based on the first one-time programming undo information stored in the secure memory subsystem, the one-time programing undo instruction; and configuring, by the component in response to authenticating the first one-time programming instruction, the secure memory subsystem to allow modification to the first personality configuration information.

15. The method of claim 14, wherein the first component operations include encryption operations that prevent the reading and writing of data without authentication credentials.

16. The method of claim 14, further comprising:

receiving, by the component from the component configuration system subsequent to configuring the secure memory subsystem to allow modification to the first personality configuration information, second personality configuration information;

providing, by the component, the second personality configuration information in the secure memory subsystem in place of the first personality configuration information to configure the component to perform second component operations that are different than the first component operations;

receiving, by the component from the component configuration system, a second one-time programming instruction and second one-time programming undo information;

configuring, by the component in response to receiving the second one-time programming instruction, the secure memory subsystem to prevent modification to the second personality configuration information; and storing, by the component, the second one-time programming undo information in the secure memory subsystem.

17. The method of claim 16, wherein the second component operations allow the reading and writing of data without authentication credentials.

18. The method of claim 14, wherein the first one-time programming undo information is a first code that is stored in the secure memory subsystem, the one-time programming undo instruction includes a second code, and the one-time programing undo instruction is authenticated based on the second code matching the first code.

19. The method of claim 14, wherein the first one-time programming undo information is configured for use in enabling an authenticated communication session, and the one-time programing undo instruction is at least partially authenticated in response to being received via the authenticated communication session enabled using the first one-time programming undo information.

20. The method of claim 14, wherein the component is a storage device.

* * * * *